United States Patent
Luan et al.

(10) Patent No.: US 12,008,331 B2
(45) Date of Patent: Jun. 11, 2024

(54) UTILIZING VISUAL AND TEXTUAL ASPECTS OF IMAGES WITH RECOMMENDATION SYSTEMS

(71) Applicant: Microsoft Technology Licensing, LLC, Redmond, WA (US)

(72) Inventors: Xun Luan, Sunnyvale, CA (US); Aman Gupta, San Jose, CA (US); Sirjan Kafle, San Diego, CA (US); Ananth Sankar, Palo Alto, CA (US); Di Wen, Sunnyvale, CA (US); Saurabh Kataria, Newark, CA (US); Ying Xuan, Sunnyvale, CA (US); Sakshi Verma, Haryana (IN); Bharat Kumar Jain, Hyderabad (IN); Xue Xia, Los Angeles, CA (US); Bhargavkumar Kanubhai Patel, Gujarat (IN); Vipin Gupta, Bangalore (IN); Nikita Gupta, Delhi (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 383 days.

(21) Appl. No.: 17/560,436

(22) Filed: Dec. 23, 2021

(65) Prior Publication Data

US 2023/0206010 A1   Jun. 29, 2023

(51) Int. Cl.
  *G10L 15/22*   (2006.01)
  *G06F 40/40*   (2020.01)
  (Continued)

(52) U.S. Cl.
  CPC ............ *G06F 40/40* (2020.01); *G06N 3/04* (2013.01); *G06V 30/19147* (2022.01)

(58) Field of Classification Search
  CPC .......... G10L 15/22; G10L 15/32; G10L 15/30; G10L 15/063; G10L 15/06; G10L 15/16;
  (Continued)

(56) References Cited

U.S. PATENT DOCUMENTS 10,726,059 B1 *  7/2020  Ren ..................... G06V 10/811
10,922,583 B2 *  2/2021  Kaehler ................ G06V 40/28
(Continued)

OTHER PUBLICATIONS

"Blackstone to Acquire Ancestry®, Leading Online Family History Business, for $4.7 Billion", Retrieved From: https://www.blackstone.com/press-releases/article/blackstone-to-acquire-ancestry-leading-online-family-history-business-for-4-7-billion/, Aug. 5, 2020, 5 Pages.
(Continued)

*Primary Examiner* — Jakieda R Jackson
(74) *Attorney, Agent, or Firm* — Schwegman, Lundberg & Woessner, P.A.

(57) ABSTRACT

Described herein are systems and methods for generating an embedding—a learned representation—for an image. The embedding for the image is derived to capture visual aspects, as well as textual aspects, of the image. An encoder-decoder is trained to generate the visual representation of the image. An optical character recognition (OCR) algorithm is used to identify text/words in the image. From these words, an embedding is derived by performing an average pooling operation on pre-trained embeddings that map to the identified words. Finally, the embedding representing the visual aspects of the image is combined with the embedding representing the textual aspects of the image to generate a final embedding for the image.

20 Claims, 6 Drawing Sheets

(51) Int. Cl.
*G06N 3/04* (2023.01)
*G06V 30/19* (2022.01)

(58) Field of Classification Search
CPC ........ G06N 20/00; G06N 3/045; G06N 3/044; G06N 3/0455; G06N 3/0464; G06F 40/30; G06F 16/45; G06F 16/532; G06F 18/24; G06V 10/82; G06V 30/19173; G06V 30/10
See application file for complete search history.

(56) References Cited

U.S. PATENT DOCUMENTS

| | | | | |
|---|---|---|---|---|
| 2018/0329892 | A1* | 11/2018 | Lubbers | G06N 3/08 |
| 2021/0012102 | A1* | 1/2021 | Cristescu | G06F 40/284 |
| 2021/0034981 | A1* | 2/2021 | Feng | G06N 3/045 |
| 2021/0286989 | A1* | 9/2021 | Zhong | G06F 40/177 |
| 2022/0046206 | A1* | 2/2022 | Bui | H04N 7/08 |
| 2022/0076100 | A1* | 3/2022 | Hori | G10L 15/16 |
| 2022/0207274 | A1* | 6/2022 | Folkens | G06V 10/25 |

OTHER PUBLICATIONS

"Breaking 2.7 Percent: The Capital Angel Network and Invest Ottawa Announce First Cohort of SheBoot", Retrieved From: https://www.investottawa.ca/blog/breaking-2-7-percent-the-capital-angel-network-and-invest-ottawa-announce-first-cohort-of-sheboot/, Aug. 5, 2020, 4 Pages.

"Migrate from TensorFlow 1.x to TensorFlow 2", Retrieved From: https://www.tensorflow.org/guide/migrate, Sep. 22, 2021, 3 Pages.

"SheBoot—An Investment in the Next Generation of Women Entrepreneurs", Retrieved From: https://www.investottawa.ca/sheboot/, Retrieved On: Nov. 12, 2021, 7 Pages.

"Using the SavedModel Format", Retrieved From: https://www.tensorflow.org/guide/saved_model, Nov. 11, 2021, 19 Pages.

Howard, et al., "MobileNets: Efficient Convolutional Neural Networks for Mobile Vision Applications", In Repository of arXiv:1704.04861v1, Apr. 17, 2017, 9 Pages.

Wang, et al., "Learning Deep Structure-Preserving Image-Text Embeddings", In Proceedings of the IEEE Conference on Computer Vision and Pattern Recognition, Jun. 27, 2016, pp. 5005-5013.

Xu, et al., "Show, Attend and Tell: Neural Image Caption Generation with Visual Attention", In Repository of arXiv:1502.03044v1, Feb. 10, 2015, 22 Pages.

* cited by examiner

UTILIZING VISUAL AND TEXTUAL ASPECTS OF IMAGES WITH RECOMMENDATION SYSTEMS

TECHNICAL FIELD

The present application generally relates to a representing learning technique, which utilizes a multimodal machine learning approach to generating an embedding (e.g., a vector representation) for an image from a combination of visual and textual aspects of the image.

BACKGROUND

Many web-based or online services have recommendation systems that use ranking algorithms to rank content items in order to facilitate selecting content items that are to be presented to an end-user. For example, social networking services use ranking algorithms to rank content items when presenting content items via a feed, sometimes referred to as a content feed or news feed. Similarly, recommendation systems used with e-commerce websites and dating websites utilize ranking algorithms to rank product listings, and user profiles. Many ranking algorithms use machine learned models that have been trained to predict or output a score for each content item, where the score reflects a measure of relevance of the content item to a particular end-user to whom the content item may be presented. Accordingly, content items deemed to be the most relevant (e.g., having the highest scores) with respect to a particular end-user may be selected for presentation, and presented in order of their score, via a user interface of a feed. The machine learned models used in these ranking algorithms are typically trained to generate scores for the individual content items based on an extremely large number of input signals—referred to in machine learning parlance as features. In some instances, the features that are used by the machine learned models may be manually derived by a data scientist. Such features are frequently referred to as hand-crafted features. However, in other instances, the features used in the machine learned models of ranking algorithms may be learned features. In machine learning, the concept of representation learning, sometimes referred to as feature learning, involves a set of techniques that allow a system to automatically discover the representations needed for feature detection and classification tasks from raw data. Accordingly, and as the name suggests, representation learning allows for learning representations of data, which replaces the often-arduous task of manually hand-crafting features.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for processing an image to generate for the image a single embedding (e.g., a vector representation of the image) having component parts that include a first portion that is representative of visual aspects of the image, and a second portion that is representative of textual aspects of the image. The embedding for the image is then utilized as a feature by one or more machine learned models deployed as part of a ranking algorithm used in ranking content items to be presented to an end-user of an online service. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Leveraging information associated with images included in content items is important for modern recommendation systems powering applications like the feed of an online service, for example, such as a web-based or online social networking service. For instance, many online services that provide feeds have a high percentage of content items shared via the feed that contain images. Furthermore, a significant percentage of the images included with the shared content items include or have embedded text—that is, text presented as part of the image. Consistent with embodiments of the present invention, a multimodal model is provided to generate for an image a single embedding that includes component parts representative of different aspects of the image. In particular, the multimodal model uses an image captioning model with an encoder-decoder architecture for generating captions for images, and to derive for an image a first embedding (e.g., an Image Caption, or IC embedding) that is representative of visual aspects of the image. In addition, the multimodal model applies an optical character recognition (OCR) algorithm to the image to detect text (e.g., words) that are included with the image, and then generates from these detected words a second embedding (e.g., an OCR embedding) that is representative of the text identified within the image. Finally, these two embeddings are combined (e.g., concatenated) to derive for the image a single embedding that is representative of both visual and textual aspects of the image. This final embedding for the image can then be used, during a training phase, to train a machine learned model deployed as part of a ranking algorithm associated with a recommendation system, and also at inference time, to predict the relevance of an image, and thus the relevance of a content item, with respect to a particular end-user.

Accordingly, the multimodal model described herein is an improvement, in several respects, to recommendation systems that process or otherwise involve content items that may include images. First, the representation that is derived for the image is multimodal as it encodes information about the image (e.g., objects detected within the image), as well as the text that is included within the image. Furthermore, the representation of the image is learned with training data that is obtained from the domain in which the learned representations (e.g., the embeddings representing the images) will be used. For example, in some instances, the training data used to train the encoder-decoder of the image captioning model are labeled images obtained from content items posted to the feed. For example, to derive a training dataset, images obtained from the feed may be analyzed using a crowdsourcing strategy to generate for each image a caption. As such, the IC embedding derived for an image will be derived with an image captioning model based on an encoder-decoder architecture that has been trained from data obtained from images posted to the feed. Similarly, and as described in greater detail below, the OCR embedding that is derived from the text identified within an image may be derived using pre-trained word embeddings that have been generated from a corpus of words obtained from the feed, and/or from other content associated with the online service. Because the machine learned models are trained with training data obtained from the online service, as opposed to some external training dataset, the performance of the resulting embeddings for the images in accurately predicting the relevance of a content item with respect to a particular end-user is increased as compared to other approaches. Other aspects and advantages of the inventive subject matter described herein will be readily apparent from the description of the figures that follow.

Compared to previous approaches of embedding compression, like PCA on Inception V3 embeddings, this approach has the following advantages:

Learnable compression layer. Unlike PCA (Principal Component Analysis) which is a nonparametric method, our approach has a learnable compress layer that is trained end-to-end with labeled images. We believe the training process will help to reserve more useful information after compression.

Provable performance. Since the compression layer is trained end-to-end in the image captioning model, it can be naturally evaluated on the image captioning labeled datasets, so that the compressed embeddings can have comparable performance to the baseline (uncompressed embeddings). On the other hand, traditional compression methods like PCA could not be directly evaluated. We don't know the quality of these compressed embeddings until tested on the downstream tasks.

Another contribution towards the innovation of this solution is the use of OCR text embedding as an image feature in Feed/Ads Ranking. Apart from visual signals, a large amount of the image content on LinkedIn contains textual information. In many cases, there is no other information available in the image apart from the embedded text. (data analysis). Unlike previous image embeddings (like InceptionV3 embedding) which only capture the visual information from the image, image OCR text embeddings are able to capture textual information by understanding the embedded texts.

Figure 1:
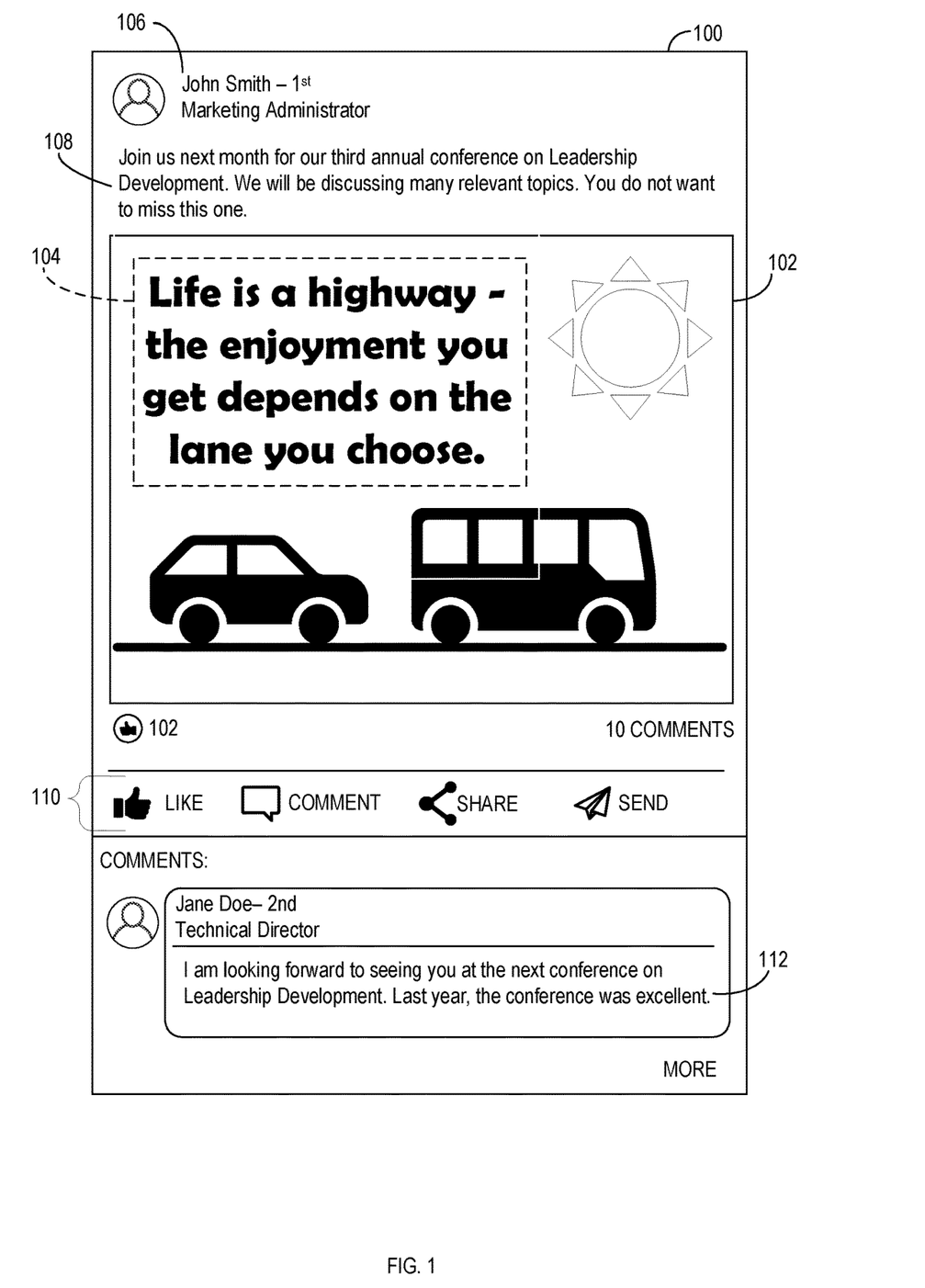
FIG. 1 is a user interface diagram showing an example of a content item, including an image with embedded text, that has been posted to a feed of an online service, consistent with embodiments of the invention.

Last but not least, our final solution, the concatenation of IC embedding and OCR embedding, can achieve the best result in image-related recommendation systems because it's a combination of visual & textual understanding FIG. 1 is a user interface diagram showing an example of a content item 100, including an image 102 with embedded text 104, that has been posted to a feed of an online service or system, consistent with embodiments of the invention. The content item 100 includes a significant number of data elements that might be used as input features provided to a machine learned model of a ranking algorithm, and for use in ranking the image and/or content item. By way of example, the content item 100 shows the name of an end-user 106, and information about the end-user, who is responsible for posting or sharing the content item 100. In this example, in addition to the name of the end-user 106, the job title of the end-user is also presented, along with an indicator of the degree of separation (e.g., "$1^{st}$") between the end-user who shared the content item and an end-user viewing the content item 100. In addition to the information about the end-user that is actually presented with the content item 100, any information included in an end-user profile of the end-user may be used as an input feature with a machine learned model.

When an end-user is sharing a content item, the end-user is typically prompted via a user interface to provide some text—referred to herein as the share text 108. This share text 108 is presented as a part of the content item 100. This share text 108 may be analyzed for purposes of deriving one or more input features for a machine learned model, used in ranking the content item 100 by a recommendation system.

When the content item 100 is presented in the feed of other end-users, the user interface of the feed may provide various icons or buttons representing social gestures or interactions that the end-user can take to interact with the content item. By way of example and with respect to reference number 110, the content item 100 is shown with a first icon that allows an end-user to "like" the content item, a second icon that allows an end-user to comment on the content item, a third icon that allows an end-user to share the content item (e.g., via the feed), and a fourth content item that allows the end-user to send the content item directly to one or more other end-users (e.g., via a messaging application). All of these social gestures, as well as the various end-user profile attributes of the end-users who interact with the content item, can be monitored, logged, and then subsequently used as input features to a machine learned model that is used by a ranking algorithm of a content recommendation system. Whereas conventionally, aspects of the image have not generally been used as input features for ranking content items, consistent with embodiments of the present invention, the image 102, as well as the text 104 appearing in the image, are used as input to a multimodal model that generates an embedding for the image. This embedding can then be used by a machine learned model that facilitates the derivation of a score representing the relevance of the image and/or a content item that includes the image, with respect to a particular end-user.

Figure 2:
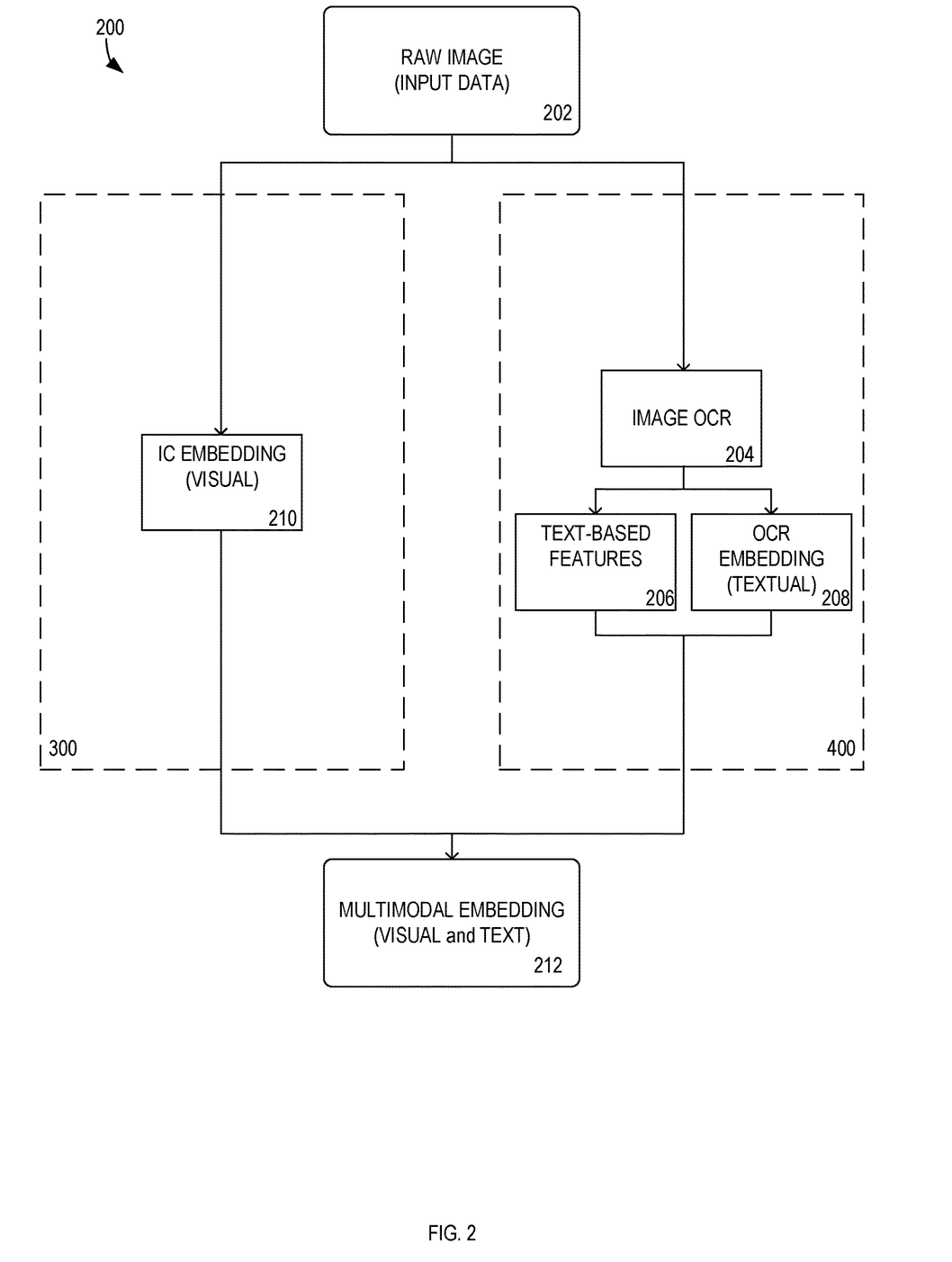
FIG. 2 is a diagram illustrating an example of a multimodal model that generates for an image, provided as input, a single embedding having component parts including a first portion that represents visual aspects of the image and a second portion that represents textual aspects of the image, consistent with embodiments of the invention.

FIG. 2 is a diagram illustrating an example of a multimodal model 200 that generates for an image 202, provided as input to the model 200, a single embedding 212 having component parts including a first portion that represents visual aspects of the image and a second portion that represents textual aspects of the image, consistent with embodiments of the invention. As illustrated in FIG. 2, the multimodal model 200 is provided as input data a raw image 202. This raw image 202 is processed, separately, by an image captioning model 300 with an encoder-decoder architecture, which derives a first embedding that is based on visual aspects of the image 202. Separately, the image is provided as input to an optical character recognition (OCR) algorithm 204. The OCR algorithm analyzes the image to detect the text—for instance, the individual words—in the image 202. The individual words identified in the image 202 are then mapped to pre-trained word embeddings (e.g., vector representations of the individual words), before an average pooling operation is applied to the word embeddings to derive the OCR embedding 208. Accordingly, the OCR embedding 208 represents textual aspects of the image 202.

Additionally, consistent with some embodiments of the present invention, output of the OCR algorithm may be used to derive additional text-based features 206, which may also be encoded within the final embedding 212 for the image. For example, with some embodiments, the OCR algorithm may generate a confidence score indicating a measure of confidence that the text has been detected and/or identified accurately. Generally, a higher confidence score indicates that the text within the image is dominant within the image. Other derived textual features may include, but not necessarily be limited to:

The word count or number of words identified in the text.
The size of an OCR bounding box for the text, relative to the overall image size.
One or more scores (e.g., matching scores) indicating the extent to which text identified in the image matches text included in the share text, comment text, and/or, one or more hashtags ("#") specifically.
The character font size of the text identified in the image.

Figure 3:
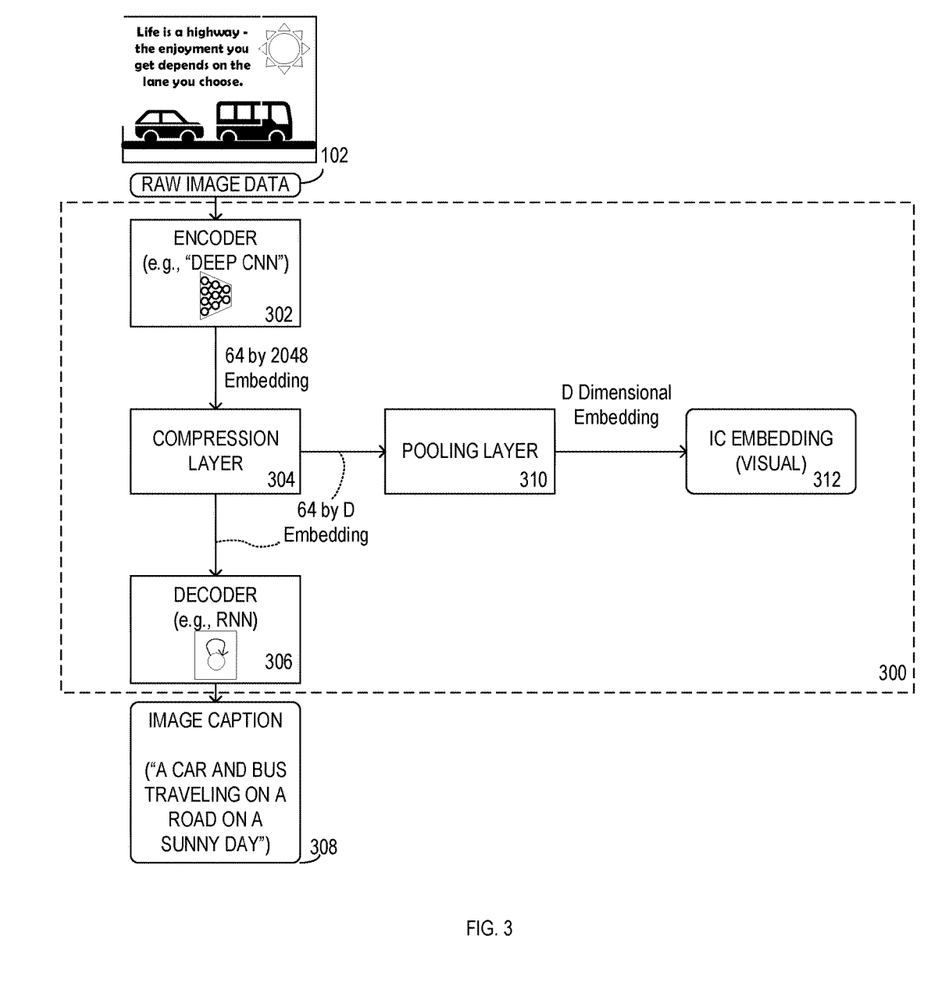
FIG. 3 is a diagram illustrating an image captioning model based on an encoder-decoder architecture for generating an image caption for an image, and as a byproduct, an embedding that represents visual aspects of the image, consistent with embodiments of the invention.

FIG. 3 is a diagram illustrating an example of an image captioning model 300, based on an encoder-decoder architecture, for generating an image caption 308 for an input image 102, wherein a byproduct of generating the image caption 308 is an intermediate output (e.g., an embedding) that represents visual aspects of the image 102, consistent with embodiments of the invention. Consistent with some embodiments, the image captioning model 300 may be based on an encoder-decoder architecture known in the art as a "Show, Attend and Tell" model. Accordingly, at least with some embodiments, the encoder portion 302 of the encoder-decoder architecture may be based on a deep convolutional neural network (CNN) based on or similar to that known in the art as the Inception v3 model—a model widely used in image analysis and object detection. Similarly, the decoder portion 306 of the encoder-decoder architecture may be based on a recurrent neural network (RNN)—specifically, an attention-based, Long Short-Term Memory CNN. Of course, in various alternative embodiments, the encoder and decoder might also be based on other models and/or other neural network architectures.

Consistent with some embodiments, training of the image captioning model 300 is accomplished with a training dataset consisting of images that have been previously posted to the feed. Using a crowdsourcing technique, these images are shown to a number of experts who manually generate an appropriate caption for each image, resulting in what is commonly referred to as a labeled training dataset. In this case, the label is the caption that corresponds with what is portrayed by the image. Using this training dataset, the encoder 302, compression layer 304, and decoder 306, are iteratively provided individual instances of data from the training dataset in order to condition the neural nodes, or weights, of the respective neural networks, so that the encoder-decoder accurately generate the appropriate caption that correspond with each image in the training dataset.

During the inference stage, the image captioning model 300 receives as input an image 102, processes the image with the encoder 302 to derive an embedding, and then decodes the embedding with a decoder 306 to derive the words representing an image caption 308 for the image 102. However, in contrast with a conventional encoder-decoder architecture, in which the output of the encoder is generally provided, directly, as an input to the decoder, consistent with embodiments of the present invention, the output of the encoder is first compressed with a compression layer 304. The compression layer 304 reduces the dimensionality of the embedding output by the encoder 302, so that the resulting embedding, after pooling, has a dimensionality, "D", suitable for use as an input feature by a ranking algorithm of a recommendation system. For instance, as the recommendation system may be providing recommendations in real time, or near real time, the dimensionality of the embedding must be such that latency is not introduced into the real time processing pipeline of the recommendation system. Thus, the compression layer allows the output from the encoder to be compressed to a dimensionality that ensures that no latency is introduced, and in some cases, the dimensionality of the resulting embedding will be consistent with one or more existing models used by the recommendation system. While the value of "D" may vary from one embodiment to the next, at least with some embodiments the value of "D" is one of thirty (30), fifty (50), or one hundred (100).

Consistent with some embodiments, the output of the encoder is a tensor, having a size of sixty-four (64) by two-thousand, forty-eight (2048). The compression layer 304 compresses the tensor along the two-thousand, forty-eight (2048) dimension to make it smaller—for example, to a dimensionality of "D", which may be thirty (30), fifty (50), or one hundred (100). The compression layer 304 is trained, end-to-end, with the encoder 302 and decoder 306 on the image captioning task. Finally, the intermediate output of the compression layer 304, which is a sixty-four (64) by "D" embedding, is subjected to a pooling layer 310, which averages the sixty-four (64) elements to a single embedding having a dimension of "D". This final embedding is the image captioning, or IC embedding 312, which is representative of the visual aspects of the image 102. Note, the image caption 308 output by the decoder 306 is not used as an input in generating the embedding 312 for the image 102, but can be reviewed to verify that the encoder-decoder is performing appropriately. As described in connection with FIG. 2, the resulting embedding 312 is combined with a second embedding—for example, the OCR embedding 412—to derive for the image 102 a final embedding that is representative of both visual and textual aspects of the image.

Figure 4:
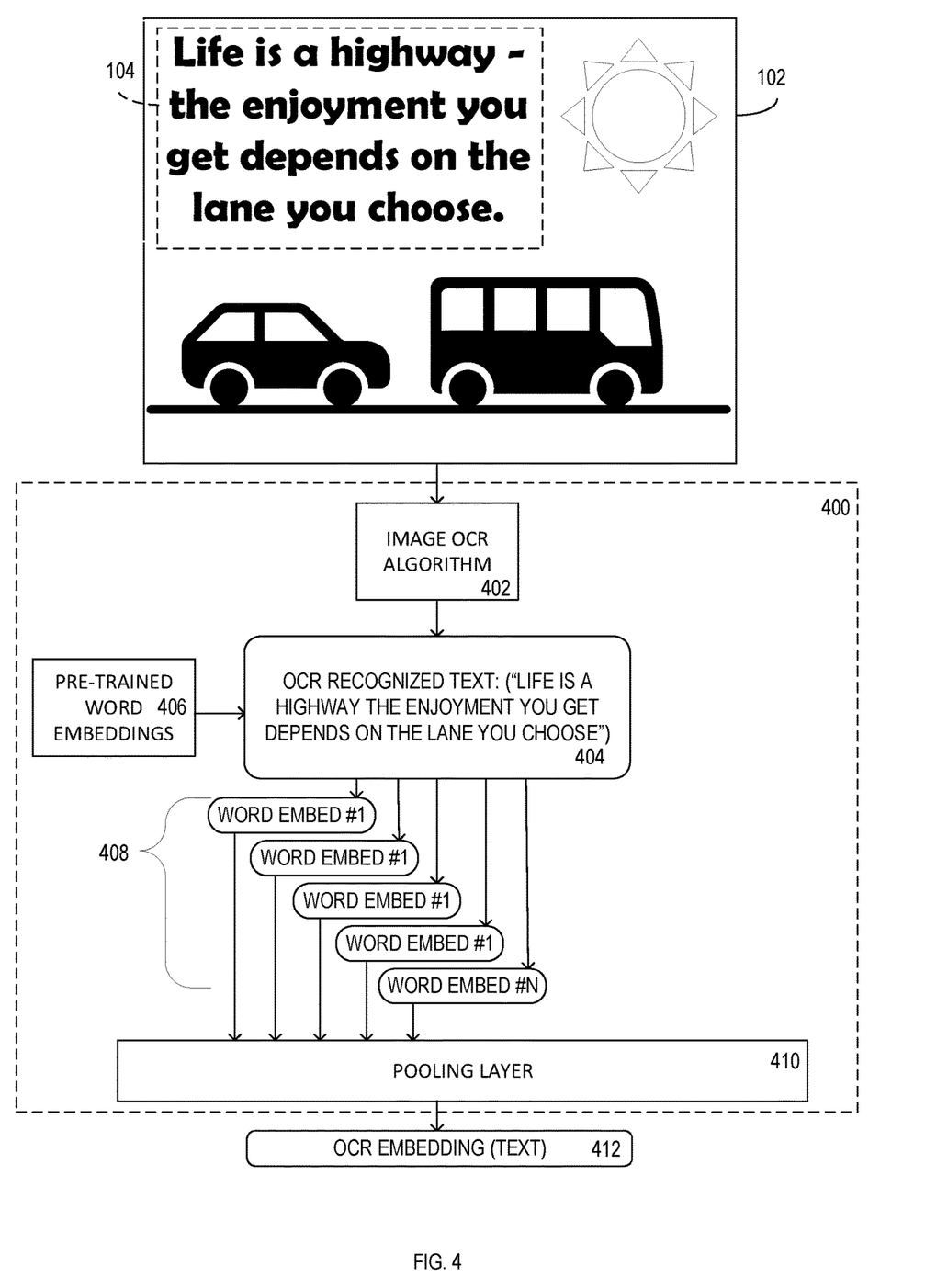
FIG. 4 is a diagram illustrating a processing pipeline for generating an embedding based on textual aspects of an image, consistent with embodiments of the invention.

FIG. 4 is a diagram illustrating a processing pipeline 400 for generating an embedding—for example, an OCR embedding 412—based on textual aspects 104 of an image 102, consistent with embodiments of the invention. As illustrated in FIG. 4, an image 102 having embedded text 104 is provided as input to an OCR algorithm 402. The OCR algorithm 402 processes the raw image 102 to identify the individual words 104 included in the image 102. The recognized text 404 is then further processed to generate for each word, a word embedding 408. In this instance, the individual words detected in the text 404 are simply mapped to pre-trained word embeddings 406, so that each word identified or recognized in the text is mapped to an existing word embedding 406 that was previously generated for that word. With some embodiments, some filtering of words may occur, such that certain words (e.g., articles and conjunctions, such as "a", "the", "and", "or" etc.) are filtered out from further analysis and processing.

With some embodiments, the pre-trained word embeddings 406 are vector representations of words, derived with a machine learning model. In machine learning and natural language processing, the term "word embedding" is used to describe a technique that generally involves encoding the meaning of some raw data (e.g., a word) into a real-valued vector, so that the vector representations of individual words will be close together in the embedding space when the individual words have a similar meaning. By way of example, in the specific domain of job titles, the job title, "software engineer," has a meaning that is at least somewhat similar to the job title, "computer programmer." Accordingly, when each job title is represented as a vector in a common embedding space, the distance (e.g., Euclidian distance) between the two vectors would be less than the distance between either one of the two vectors and a third vector corresponding with a vector representation for the job title, "dentist."Accordingly, consistent with embodiments of the present invention, one of a variety of known techniques may be applied to words obtained from the feed of the online service, or from other content associated with the online service. Accordingly, the pre-trained word embeddings 406 will have been derived with training data (e.g., words) relevant to the feed content of the online service. The words are provided as input to a trained machine learning model that derives for each word, a vector representation, or "word embedding." Consistent with some embodiments, the pre-trained word embeddings 406 may be derived using one of a variety of machine learning models and processing techniques, such as GloVe (Global Vectors for Word Representation), or Word2vec, or some similar technique.

As shown in FIG. 4, after each word identified by the OCR algorithm 402 has been converted to, or mapped to, a word embedding 408, the word embeddings 408 are provided as input to a pooling layer 410, which, for example, applies an average pooling operation to the group of word embeddings 408 to generate a final OCR embedding 412, which is representative of the text 104 in the image 102.

The IC embedding 312 that results from processing the image 102 with the image captioning model 300 encodes information about visual aspects of the image 102. Similarly, the OCR embedding 412 that results from processing the image 102 with the OCR processing pipeline 400 encodes information about textual aspects of the image 102. As shown by the example multimodal model 200 of FIG. 2, these two embeddings are ultimately combined to generate a single, final embedding, that is representative of both visual and textual aspects of the image 102. Once the final embedding is generated for an image, the final embedding may be used as an input to another machine learning model (not shown) that is used to derive a ranking score for the image, or, for a content item that includes the image. Typically, the embedding for the image will be one of a variety of input features provided to a machine learned model for purpose of deriving a score for the image or the content item. Accordingly, the final embedding may be used as one of a significant number of other input features when ranking content items relative to one another for purposes of determining what content to select for presentation to an end-user, and in what order the content items should be presented. The technique described above generally are applicable to any content items that include images, to include both user-generated images and content items as well as advertisement-related content items.

Figure 5:
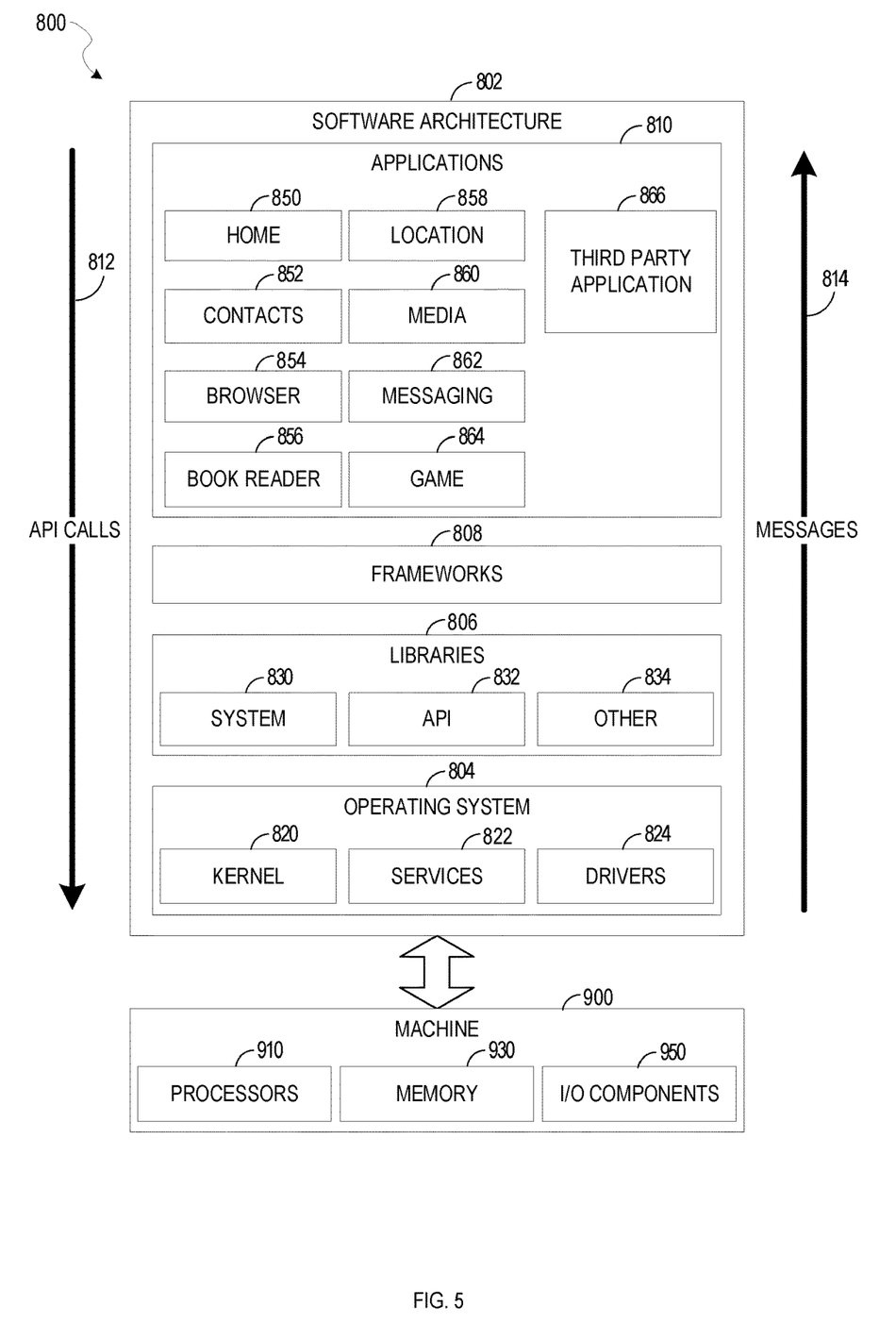
FIG. 5 is a block diagram illustrating a software architecture, which can be installed on any of a variety of computing devices to perform methods consistent with those described herein.

FIG. 5 is a block diagram illustrating a software architecture 802, which can be installed on any of a variety of computing devices to perform methods consistent with those described herein. FIG. 5 is merely a non-limiting example of a software architecture, and it will be appreciated that many other architectures can be implemented to facilitate the functionality described herein. In various embodiments, the software architecture 802 is implemented by hardware such as a machine 900 of FIG. 6 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 606 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 6:
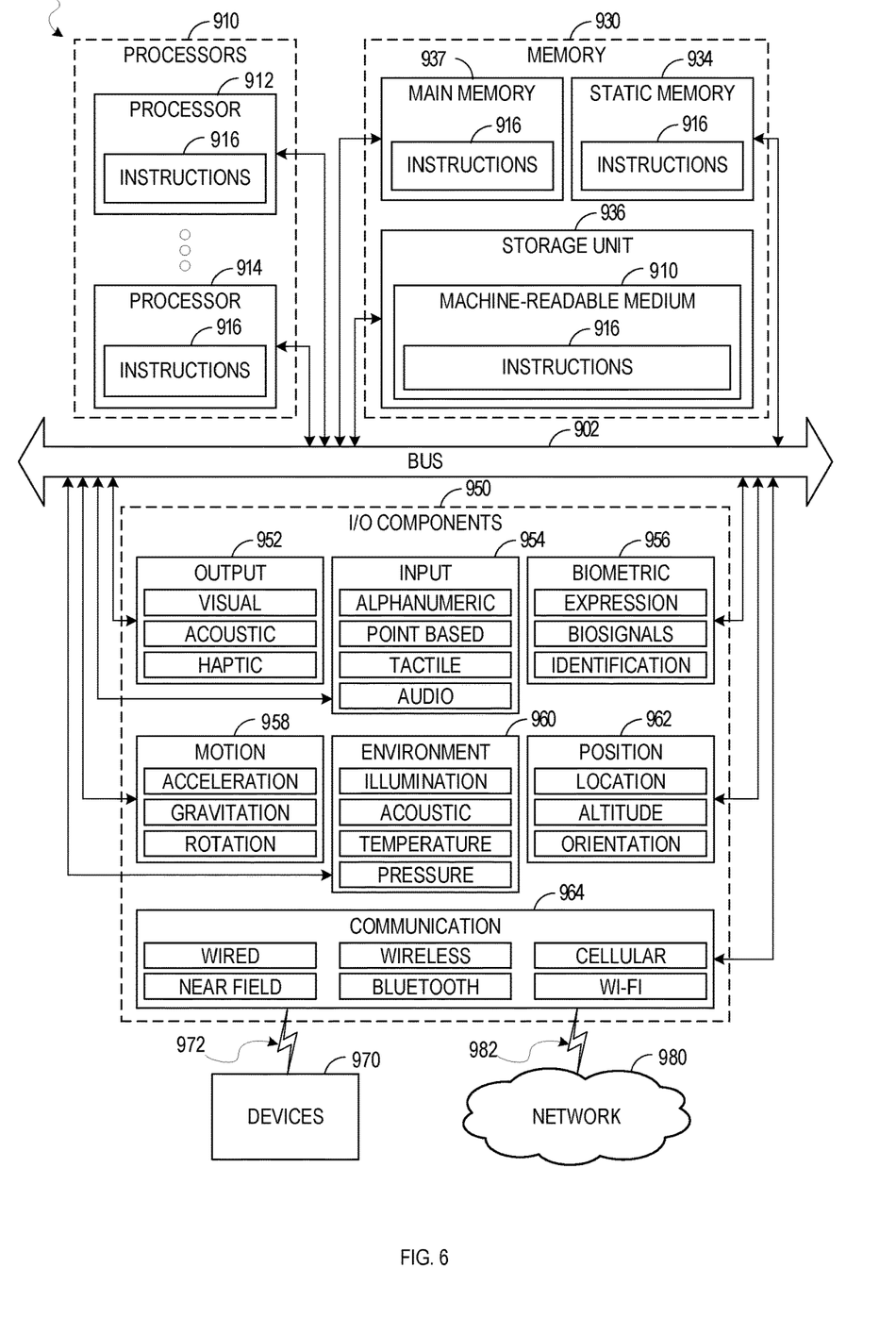
FIG. 6 illustrates a diagrammatic representation of a machine 900 in the form of a computer system within which a set of instructions may be executed for causing the machine to perform any one or more of the methodologies discussed herein, according to an example embodiment.

FIG. 6 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods 400, 500, or 600. Additionally, or alternatively, the instructions 916 may implement the systems described in connection with any of FIGS. 2 or 3, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method comprising:
   with a machine learning algorithm, training an encoder-decoder model to generate a caption for an image by generating with the encoder an embedding, and then decoding the embedding with the decoder to generate the caption, wherein a dataset comprising a plurality of images with associated captions is used to train the encoder-decoder model;
   generating a first embedding for an image by:
   detecting words present in the image with an optical character recognition (OCR) algorithm;
   using pre-trained word embeddings to derive a word embedding for each word detected in the image; and
   performing an average pooling operation on the word embeddings for each word detected in the image, wherein the result of the average pooling operation is the first embedding for the image;
   generating a second embedding for the image by:
   using the image as input to the pre-trained encoder-decoder model,
   generating from the image with the encoder the second embedding for the image;
   combining the first embedding with the second embedding to derive for the image a final embedding; and
   storing the final embedding for the image.

2. The computer-implemented method of claim 1, wherein i) the encoder of the encoder-decoder model is a convolutional neural network that outputs a tensor having a size of 64 by 2048, and ii) the encoder-decoder model includes a compression layer between the encoder and the decoder, the method further comprising:
   generating the second embedding for the image by:
      with the compression layer, compressing the tensor output by the encoder to a size of 64 by D, wherein D is 30, 50 or 100; and
      performing an average pooling operation on the individual components of the tensor to generate the second embedding with a dimension of D.

3. The computer-implemented method of claim 2, wherein the compression layer is implemented as a 1 by 1 convolutional layer having D filters, each filter having a size of 1 by 1 by 2048.

4. The computer-implemented method of claim 2, wherein the encoder of the encoder-decoder model is implemented based on the Inception v3 model.

5. The computer-implemented method of claim 1, further comprising:
   deriving with the OCR algorithm a confidence score representing a measure of confidence that the OCR algorithm was accurate in detecting the words present in the image; and
   combining the confidence score with the first embedding and the second embedding to generate the final embedding for the image.

6. The computer-implemented method of claim 1, wherein combining the first embedding with the second embedding to derive for the image a final embedding comprises:
   concatenating the first embedding with the second embedding to derive for the image the final embedding.

7. The computer-implemented method of claim 1, further comprising:
   using the final embedding for the image as an input feature to a machine learned model that has been trained to generate a score for an item of content that includes the image, wherein the score is used in ranking the content item relative to other content items.

8. A system comprising:
   a memory storage device for storing computer-executable instructions; and
   at least one processor, which, when executing the computer-executable instructions, causes the system to:
   with a machine learning algorithm, train an encoder-decoder model to generate a caption for an image by generating with the encoder an embedding, and then decoding the embedding with the decoder to generate the caption, wherein a dataset comprising a plurality of images with associated captions is used to train the encoder-decoder model;
   generate a first embedding for the image by:
   detecting words present in an image with an optical character recognition (OCR) algorithm;
   using pre-trained word embeddings to derive a word embedding for each word detected in the image; and
   performing an average pooling operation on the word embeddings for each word detected in the image, wherein the result of the average pooling operation is the first embedding for the image;
   generate a second embedding for the image by:
   using the image as input to the pre-trained encoder-decoder model, generate from the image with the encoder the second embedding for the image;
   concatenate the first embedding with the second embedding to derive for the image a final embedding; and
   store the final embedding for the image.

9. The system of claim 8, wherein i) the encoder of the encoder-decoder model is a convolutional neural network that outputs a tensor having a size of 64 by 2048, and ii) the encoder-decoder model includes a compression layer between the encoder and the decoder, and iii) the computer-executable instructions, when executed by the processor, cause the system to:
   generate the second embedding for the image by:
      with the compression layer, compressing the tensor output by the encoder to a size of 64 by D, wherein D is 30, 50 or 100; and
      performing an average pooling operation on the individual components of the tensor to generate the second embedding with a dimension of D.

10. The system of claim 9, wherein the compression layer is implemented as a 1 by 1 convolutional layer having D filters, each filter having a size of 1 by 1 by 2048.

11. The system of claim 9, wherein the encoder of the encoder-decoder model is implemented based on the Inception v3model.

12. The system of claim 9, wherein the computer-executable instructions, when executed by the at least on processor, cause the system to:
derive with the OCR algorithm a confidence score representing a measure of confidence that the OCR algorithm was accurate in detecting the words present in the image; and
combine the confidence score with the first embedding and the second embedding to generate the final embedding for the image.

13. The system of claim 8, wherein the computer-executable instructions, when executed by the at least on processor, cause the system to:
use the final embedding for the image as an input feature to a machine learned model that has been trained to generate a score for an item of content that includes the image, wherein the score is used in ranking the content item relative to other content items.

14. A system comprising:
means for training an encoder-decoder model to generate a caption for an image by generating with the encoder an embedding, and then decoding the embedding with the decoder to generate the caption, wherein a dataset comprising a plurality of images with associated captions is used to train the encoder-decoder model;
means for generating a first embedding for the image by:
detecting words present in an image with an optical character recognition (OCR) algorithm;
using pre-trained word embeddings to derive a word embedding for each word detected in the image; and
performing an average pooling operation on the word embeddings for each word detected in the image, wherein the result of the average pooling operation is the first embedding for the image; means for generating a second embedding for the image by:
using the image as input to the pre-trained encoder-decoder model, generating from the image with the encoder the second embedding for the image;
means for combining the first embedding with the second embedding to derive for the image a final embedding; and
means for storing the final embedding for the image.

15. The system of claim 14, wherein i) the encoder of the encoder-decoder model is a convolutional neural network that outputs a tensor having a size of 64 by 2048, and ii) the encoder-decoder model includes a compression layer between the encoder and the decoder, the system further comprising:
means for generating the second embedding for the image by:
with the compression layer, compressing the tensor output by the encoder to a size of 64 by D, wherein D is 30, 50 or 100; and
performing an average pooling operation on the individual components of the tensor to generate the second embedding with a dimension of D.

16. The system method of claim 15, wherein the compression layer is implemented as a 1 by 1 convolutional layer having D filters, each filter having a size of 1 by 1 by 2048.

17. The system of claim 15, wherein the encoder of the encoder-decoder model is implemented based on the Inception v3 model.

18. The system of claim 14, further comprising:
means for deriving with the OCR algorithm a confidence score representing a measure of confidence that the OCR algorithm was accurate in detecting the words present in the image; and
means for combining the confidence score with the first embedding and the second embedding to generate the final embedding for the image.

19. The system of claim 14, further comprising:
means for concatenating the first embedding with the second embedding to derive for the image the final embedding.

20. The system of claim 14, further comprising:
means for using the final embedding for the image as an input feature to a machine learned model that has been trained to generate a score for an item of content that includes the image, wherein the score is used in ranking the content item relative to other content items.

* * * * *